United States Patent
Takeuchi et al.

(10) Patent No.: US 8,204,666 B2
(45) Date of Patent: Jun. 19, 2012

(54) DRIVING SUPPORT DEVICE, DRIVING SUPPORT METHOD, AND DRIVING SUPPORT PROGRAM

(75) Inventors: Atsushi Takeuchi, Anjo (JP); Takayuki Miyajima, Okazaki (JP); Fumiharu Ogawa, Okazaki (JP); Hideaki Koto, Kariya (JP); Hiroyuki Kodama, Kariya (JP); Masaki Maruyama, Kariya (JP)

(73) Assignee: Aisin AW Co., Ltd. (JP)

( * ) Notice: Subject to any disclaimer, the term of this patent is extended or adjusted under 35 U.S.C. 154(b) by 423 days.

(21) Appl. No.: 12/401,364

(22) Filed: Mar. 10, 2009

(65) Prior Publication Data

US 2009/0234550 A1   Sep. 17, 2009

(30) Foreign Application Priority Data

Mar. 13, 2008   (JP) .................................. 2008-064092

(51) Int. Cl.
  *G06G 7/76*   (2006.01)
(52) U.S. Cl. ......................................................... 701/70
(58) Field of Classification Search .................... 701/70, 701/96, 93, 94, 98, 1, 36, 45; 180/272; 340/425.5, 340/540, 576
See application file for complete search history.

(56) References Cited

U.S. PATENT DOCUMENTS

| | | | |
|---|---|---|---|
| 6,076,034 A * | 6/2000 | Satoh et al. | 701/70 |
| 6,161,072 A * | 12/2000 | Clapper | 701/93 |
| 6,223,118 B1 | 4/2001 | Kobayashi et al. | 701/96 |
| 6,836,719 B2 * | 12/2004 | Andersson et al. | 701/93 |
| 2001/0008989 A1 | 7/2001 | Minowa et al. | 701/96 |
| 2002/0069010 A1 | 6/2002 | Nishira et al. | 701/96 |
| 2004/0030497 A1 * | 2/2004 | Knoop et al. | 701/301 |
| 2005/0234626 A1 * | 10/2005 | Shiiba et al. | 701/70 |
| 2006/0041372 A1 * | 2/2006 | Kubota et al. | 701/200 |
| 2006/0095195 A1 * | 5/2006 | Nishimura et al. | 701/96 |
| 2007/0100532 A1 * | 5/2007 | Miyajima et al. | 701/95 |
| 2007/0124027 A1 * | 5/2007 | Betzitza et al. | 701/1 |

FOREIGN PATENT DOCUMENTS

| | | |
|---|---|---|
| DE | 20 2004 003692 | 7/2005 |
| DE | 10 2004 039286 | 8/2005 |
| JP | 05-042868 | 2/1993 |
| JP | 10-103469 | 4/1998 |
| JP | 2000-145937 | 5/2000 |
| JP | 2001-080496 | 3/2001 |
| JP | 2006-290149 | 10/2006 |

* cited by examiner

*Primary Examiner* — Darnell Jayne
*Assistant Examiner* — Patrick Hawn
(74) *Attorney, Agent, or Firm* — Bacon & Thomas, PLLC

(57) ABSTRACT

Factor information is acquired that indicates at least one factor that imposes a psychological effect on a driver of a host vehicle when the host vehicle is traveling on a road with a descending slope ahead of the host vehicle. An overall psychological effect that is imposed on the driver when the host vehicle is traveling on the road with the descending slope is acquired based on the factor information. The vehicle speed is controlled in a vehicle speed control section in accordance with the overall psychological effect.

11 Claims, 8 Drawing Sheets

DRIVING SUPPORT DEVICE, DRIVING SUPPORT METHOD, AND DRIVING SUPPORT PROGRAM

INCORPORATION BY REFERENCE

The disclosure of Japanese Patent Application No. 2008-064092 filed on Mar. 13, 2008, including the specification, drawings and abstract is incorporated herein by reference in its entirety.

BACKGROUND OF THE INVENTION

1. Field of the Invention

The present invention relates to a driving support device, a driving support method, and a driving support program that assist driving of a vehicle.

2. Description of the Related Art

For some time, a system has been known that determines whether or not the road on which a vehicle is traveling is a descending slope. If the traveled road is a descending slope, the system determines whether deceleration is necessary, based on the vehicle speed and the change in elevation. If deceleration is necessary, the system turns off overdrive of an automatic transmission. (Refer, for example, to Japanese Patent Application Publication No. JP-A-2000-145937.)

SUMMARY OF THE INVENTION

However, the previously known systems are not able to perform vehicle speed control that is appropriately suited to the psychological state of the driver. That is, even when the road is a descending slope, there are various road conditions, such as the grade, the length of the slope, and the like, as well as surrounding circumstances, that have a psychological effect on the driver. The vehicle speed and the degree of deceleration that are required vary according to the total psychological effect. For example, in a case where there are numerous factors that impose psychological stress on the driver, acceleration will make the driver feel frightened, and in a case where there are few factors imposing psychological stress, excessive deceleration will make the driver feel annoyed.

However, because the known system decelerates by turning the overdrive oft the degree of deceleration that can be achieved, by turning the overdrive off, is fixed. Thus, the known system cannot perform vehicle speed control that is appropriately suited to the psychological state of the driver.

The present invention addresses the foregoing problem, and it is an object of the present invention to perform vehicle speed control that is appropriately suited to the psychological state of the driver.

In order to address the above-described problem, the present invention determines an overall psychological effect that is imposed on the driver when the vehicle is traveling on a road with a descending slope ahead of the vehicle, then in accordance with the determined overall psychological effect, controls the vehicle speed through a vehicle speed control section that is installed in the vehicle. In other words, the present invention specifies the nature of the vehicle speed control by determining the overall psychological effect based on various multiple psychological effects that are imposed on the driver of the vehicle that is traveling on the road with the descending slope. Therefore, according to the present invention, it is possible to control the vehicle speed appropriately in accordance with the psychological state of the driver.

According to the present invention, a factor information acquisition unit (section) may acquire factor information which includes information that pertains to the road with the descending slope ahead of the vehicle and also includes information on factors that psychologically affect the driver of the vehicle when the vehicle is traveling on a road with a descending slope. Such factors include any factor that, in accordance with its psychological effect on the driver, makes the driver change to a vehicle speed that the driver feels to be more appropriate and comfortable. Specifically, in a case where the driver feels a psychological stress or a psychological burden that makes the driver want to decrease the vehicle speed, that psychological stress or psychological burden may serve as factor information. In a case where the driver feels that the vehicle speed must be maintained or accelerated in order to drive comfortably, that factor may also serve as factor information. Obviously, the psychological effects that drivers experience while driving vary according to the driver. According to the present invention, a typical psychological effect that the driver experiences may be specified based on statistics or the like, for example, and it may be specified (predetermined as a factor) in advance.

More specifically, the factor information can include information pertaining to at least one of a state of the road with the descending slope and a state of a road in the vicinity of the road with the descending slope. The information that indicates the state of the road with the descending slope may include an inclination angle, a distance, a friction coefficient, a curvature, and the presence of a passing lane, for example. The information that indicates the state of the road in the vicinity of the road with the descending slope may include information on a road that exists either before or after the road with the descending slope, the information including, for example, at least one of an inclination angle, a distance, a friction coefficient, a curvature, and a relationship to the road with the descending slope (a difference between the relative inclination angles or the like). Obviously, the state of the road may also be associated with the state of the vehicle. For example, the system may deem that there is no psychological effect when the vehicle is traveling in a passing lane.

The factor information may also include information pertaining to another vehicle in the vicinity of the host vehicle. That is, a psychological effect may be imposed on the driver of the vehicle by the presence of another vehicle within a specified distance from the driver's (host) vehicle, as well as by various factors pertaining to the other vehicle, such as its direction of travel, its speed relative to the host vehicle, and the like. Accordingly, including information in the total factor information that indicates these factors for (states of) the other vehicle makes it possible to control the vehicle speed of the host vehicle in accordance with the psychological effects that the other vehicle imposes on the driver.

The total factor information may also include information indicating that a braking force of a brake that is installed in the host vehicle has dropped below a specified amount. Specifically, a drop in the braking force due to brake fade, a decrease in the thickness of the brake pad, an inadequate volume of hydraulic oil, or the like, are factors that may impose psychological stress on the driver when he becomes aware of them. Accordingly, inclusion of factor information that indicates the braking force of the brake makes it possible to control the vehicle speed of the vehicle in accordance with the psychological effect that the state of the brake imposes on the driver. Of course, the braking force may be acquired by use of any of various types of sensors. Furthermore, the psychological effect may be determined according to whether or not the braking force of the brake has dropped below the specified state. The specified state may be the initial state for the braking force. Various other standards may also be used, such as making the specified state a specific degree of deterioration that has occurred in a specific consumable component, e.g. a brake pad.

An overall psychological effect acquisition unit acquires an overall (total) psychological effect that is imposed on the driver when the vehicle is traveling on a road with a descending slope. The overall psychological effect may be determined as a composite psychological effect that is due to a plurality of factors that pertain to the road with the descending slope, based on the factor information for each of a plurality of factors. The overall psychological effect may be evaluated by various types of units. The overall psychological effect may be evaluated as a numerical value that corresponds to the degree of the psychological effect and/or may be evaluated in terms of different levels (high, medium, low, and the like). Accordingly, the psychological effects of individual factors may be evaluated by various types of indices, and the overall psychological effect may be evaluated by raising and lowering the indices for a plurality of the factors.

For example, for each factor that imposes a psychological effect on the driver, an item of factor information can be defined by associating the factor with a degree of psychological stress that is imposed on the driver. This makes it possible to specify the overall psychological effect by specifying the factors that pertain to the road with the descending slope ahead on which the vehicle is traveling and then acquiring the sum of the degrees of psychological stress for the specified factors. However, the present invention is not limited to a configuration that computes the total of the degrees of psychological stress associated with the factors that impose psychological stress. Various other configurations are possible, such as a configuration in which the value for the degree of psychological stress is decreased for a factor that does not impose psychological stress, but rather makes driving more comfortable.

In order to control the speed of the vehicle in accordance with the overall psychological effect, the vehicle speed control section may control the vehicle speed by controlling a deceleration force on the vehicle and/or by controlling an acceleration force on the vehicle. More specifically, the vehicle speed control section may control the vehicle speed by controlling braking, gear ratio, engine speed, or the like. The vehicle speed may be associated in advance with the indices for evaluating the overall psychological effect. A difference between the current vehicle speed and a target vehicle speed may also be defined in relative ways (such that the vehicle speed is maintained or accelerated), and the target vehicle speed may be defined as an absolute value. Regardless of the method used, the vehicle speed may be accelerated, decelerated, or maintained in accordance with the nature of the overall psychological effect.

Further, the technique for controlling the vehicle speed in accordance with the overall psychological effect that is imposed on the driver, as in the present invention, can also be embodied in the forms of a method and a computer-readable medium encoded with a program. Moreover, the driving support device, the encoded computer-readable medium, and the driving support method, as described above, may be in the form of various types of embodiments. The present invention may be in the form of a stand-alone driving support device, or may be in the form of structure shared with another device in the vehicle. For example, it is possible to provide a navigation device that is equipped with the driving support system (device) described above, and to provide the driving support method and the encoded driving support program as well. The present invention can also be modified as desired, such as by providing a portion of it in the form of software and a portion of it in the form of hardware, for example. The present invention may also be practiced in the form of a storage medium encoded with a program that controls the driving support device, for example, a magnetic storage medium or a magneto optical storage medium or any storage medium that may be developed in the future.

DETAILED DESCRIPTION OF THE PREFERRED EMBODIMENTS

An embodiment of the present invention will be explained in the order shown below.

Figure 1:
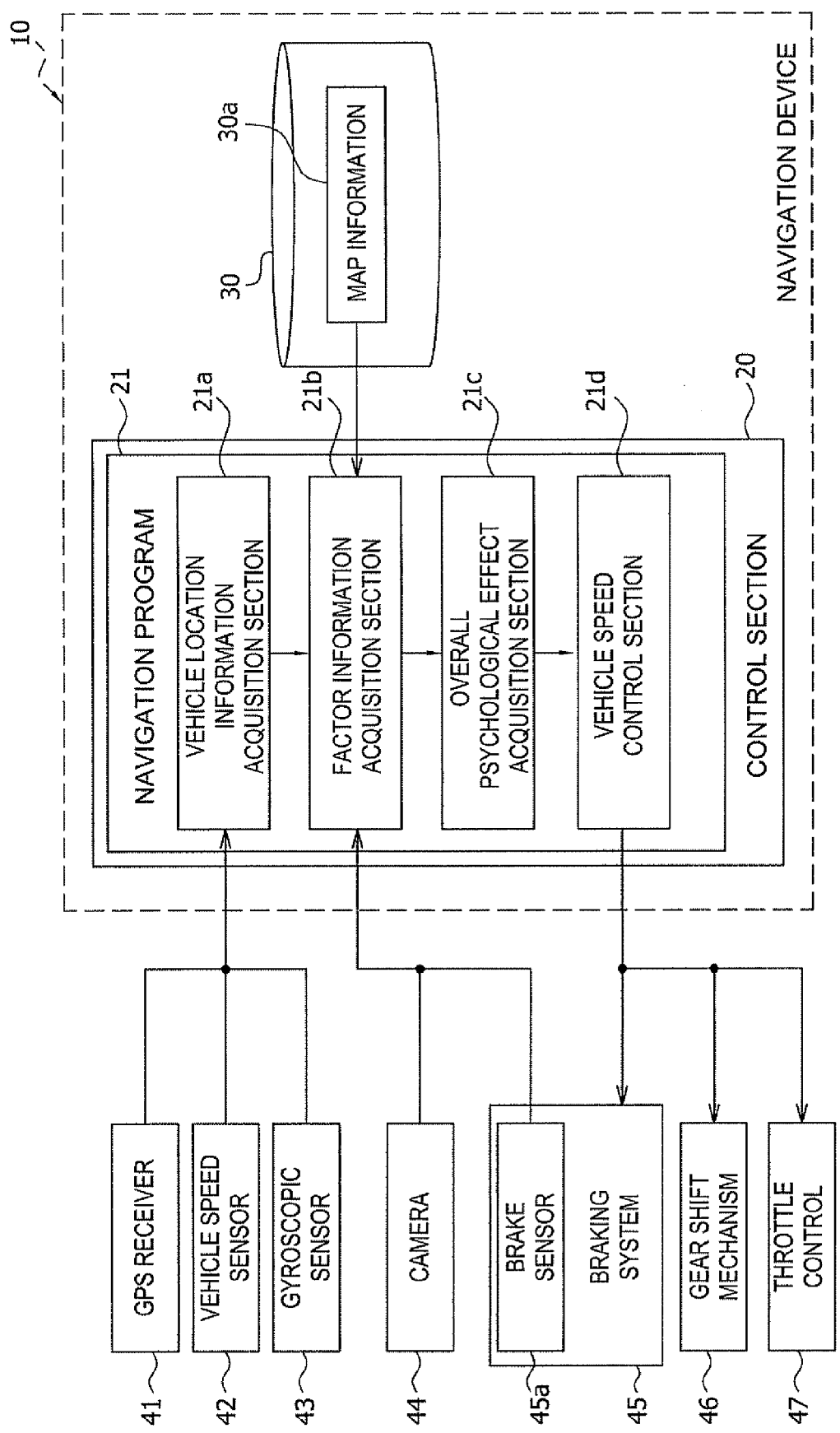
FIG. 1 is a block diagram of a navigation device that includes the driving support device (system) of the present invention.

(1) Configuration of navigation device
(2) Driving support processing
(2-1) Overall psychological effect acquisition processing
(2-2) Control state determination processing
(2-3) Vehicle speed control processing
(3) Other embodiments
(1) Configuration of Navigation Device FIG. 1 shows a navigation device 10 that functions as a driving support device in accordance with the present embodiment. The navigation device 10 includes a storage medium 30 and a control section 20 that includes a CPU, a RAM, a ROM, and the like. The control section 20 executes programs that are stored in the storage medium 30 and the ROM. One of the programs that can be executed in the present embodiment is a navigation program 21 and one of the functions of the navigation program 21 is control of vehicle speed according to an overall psychological effect on a driver of a vehicle that is traveling on a descending slope.

The vehicle in the present embodiment (the vehicle in which the navigation device 10 is installed) includes a GPS receiver 41, a vehicle speed sensor 42, a gyroscopic sensor 43, a camera 44, a braking system 45, a gear shift mechanism 46, and a throttle control 47 for implementing respective functions under control of the navigation program 21. The functions of the navigation program 21 are implemented by coordinated operation of elements 41-47 under control of the control section 20.

The GPS receiver 41 receives radio signals from GPS satellites and outputs, through an interface that is not shown in the drawing, information for computing the current location of the vehicle. The control section 20 thereby acquires the current location of the vehicle. The vehicle speed sensor 42 outputs a signal that corresponds to the rotational speed of a wheel of the vehicle. The control section 20 acquires the speed of the vehicle by receiving the signal through an interface that is not shown in the drawing. The gyroscopic sensor 43 outputs a signal that corresponds to the direction in which the vehicle is facing. The control section 20 determines the direction in which the vehicle is traveling based on the signal from the gyroscopic sensor 43, which it receives through an interface that is not shown in the drawing. The vehicle speed sensor 42 and the gyroscopic sensor 43 are used to correct the current location of the vehicle that is specified by the output signal from the GPS receiver. The current location of the vehicle is also corrected as necessary based on the driving path of the vehicle. Note that various other configurations can also be used for acquiring information that indicates the operation of the vehicle. A configuration that uses a sensor and a camera to specify the current location of the vehicle and a configuration that uses GPS signals, the vehicle's path on a map, vehicle-to-vehicle communication, and infrastructure-to-vehicle communication to acquire vehicle operation information can also be used, among others.

The camera 44 acquires an image of the area ahead of the vehicle and outputs image data. The control section 20 receives the image data through an interface (not shown in the drawing) and, based on that image data, the control section 20 determines whether or not another vehicle is traveling ahead of the host vehicle. In a case where another vehicle is traveling ahead of the host vehicle, the control section 20 acquires information on the distance between the host vehicle and the other vehicle. The control section 20 also uses the image data to determine the relationship between the vehicle and the lines on the road, and then identifies the lane in which the vehicle is traveling. Acquisition information indicating the distance between the host vehicle and the other vehicle is not limited to use of the camera 44 and may, in the alternative, use any of various types of sensors such as a millimeter wave sensor or an ultrasonic wave sensor.

The braking system 45 includes a device that controls a wheel cylinder pressure that, in turn, regulates engagement of a brake acting on a wheel of the vehicle. The control section 20 regulates the wheel cylinder pressure by outputting a control signal to the braking system 45 through an interface (not shown in the drawing). If the control section 20 outputs a control signal to the braking system 45 to increase the wheel cylinder pressure, the braking force of the brakes is increased, and the vehicle is decelerated. The control section 20 thereby controls the speed of the vehicle.

The braking system 45 according to the present embodiment also includes a brake sensor 45a. The brake sensor 45a is a sensor that outputs a signal corresponding to the braking force of the brake in the braking system 45. In the present embodiment, the brake sensor 45a outputs a signal that corresponds to oil temperature in the hydraulic system for controlling the wheel cylinder pressure. The control section 20 receives the signal through an interface that (not shown in the drawing) and, based on the oil temperature, the control section 20 determines whether or not the braking force of the brake has dropped below a predetermined level.

The gear shift mechanism 46 includes an automatic gear shift unit that has a plurality of shift stages, such as six forward speeds and one reverse speed. The gear shift mechanism 46 transmits the driving force of the engine to wheels of the vehicle at one of the gear ratios that correspond to the various shift stages to regulate the engine rotational speed. Through an interface that is not shown in the drawing, the control section 20 outputs a control signal for switching the shift stage to the gear shift mechanism 46 which switches the shift stage responsive to the control signal. The gear shift mechanism 46 therefore regulates the output torque in the vehicle and thereby controls the speed of the vehicle.

The throttle control 47 includes a device that controls a throttle valve to regulate the amount of air supplied to the engine. The control section 20 outputs a control signal to the throttle control 47 to regulate the opening of the throttle valve. Therefore, by outputting the control signal to the throttle control 47, the control section 20 can increase the amount of the intake air to raise the rotational speed of the engine and can decrease the amount of the intake air to lower the rotational speed of the engine. This makes it possible for the control section 20 to regulate the engine output by changing the engine speed. Therefore, by regulation of the engine output it is possible for the control section 20 to control the speed of the vehicle.

By executing the navigation program 21, the control section 20 performs a route search and the like for the vehicle, based on the information output from the GPS receiver 41 and map information that will be described later. The control section 20 also provides route guidance and the like through a display unit and a speaker (not shown in the drawing). Further, the navigation program 21 includes a vehicle location information acquisition section 21a, a factor information acquisition section 21b, an overall psychological effect acquisition section 21c, and a vehicle speed control section 21d for the purpose of implementing control of the speed of the vehicle through the braking system 45, the gear shift mechanism 46, and the throttle control 47, based on the overall psychological effect.

Map information 30a that the navigation program 21 uses to provide guidance is stored in the storage medium 30. The map information 30a includes node data that indicate nodes that are set on the roads that the vehicle travels, shape interpolation point data for specifying the shapes of the road links between the nodes, link data for the links (connections) between the nodes, data correlating the roads with the geographical features around them, and the like. The map information 30a is used to specify the current location of the vehicle, to provide guidance to a destination, and the like.

In the present embodiment, data for each node and each interpolation point is associated with data that indicates the location and the height (elevation) of the node or interpolation point. It is therefore possible, based on the differences in elevation among the nodes and interpolation points along a road, to acquire information that indicates whether or not the road is sloped and whether it is a descending slope or an ascending slope. It is also possible, based on the locations of the nodes and interpolation points along the road, to acquire the distance between any two points on the road and the distance between the vehicle and any given location. Furthermore, the shape of the road can be specified, and the curvature of the road can be acquired, based on the locations of the nodes and interpolation points.

Information that indicates the friction coefficient of friction for roads and information that indicates the lanes in a road are also associated with data for each node and each interpolation point in the present embodiment. It is therefore possible to determine the friction coefficient and the lanes for a road by referring to one of the node data and the interpolation point data. Obviously, the friction coefficient of a road may also be determined based on weather and probe information, and on various types of communicated information, and the lanes in a road may also be determined by use of a camera that is mounted on the vehicle and on various types of communicated information.

The vehicle location information acquisition section 21a is a module that performs processing to acquire vehicle location information indicating the location of the vehicle. The control section 20 uses the processing by the vehicle location information acquisition section 21a to acquire the output signals from the GPS receiver 41, the vehicle speed sensor 42, and the gyroscopic sensor 43, and to detect the latitude and the longitude of the current location of the vehicle. The control section 20 also refers to the map information 30a to extract a road section that matches the track of the current location of the vehicle, then specifies the location of the vehicle on the matching road section.

The factor information acquisition section 21b is a module that acquires factor information. The control section 20 uses the processing by the factor information acquisition section 21b to acquire the factor information, based on one of the map information 30a, output of the camera 44 and output of the brake sensor 45a. In the present embodiment, the factor information is information that indicates a factor that has a psychological affect on the driver of the vehicle when the vehicle is traveling on a road where there is a descending slope ahead. The control section 20 uses the processing by the vehicle location information acquisition section 21a, not only to acquire the current location of the vehicle, but also to determine whether or not a road with a descending slope exists within a specified distance ahead of the vehicle. If a road with a descending slope does exist ahead, the control section 20 acquires the factor information for the road with the descending slope.

A factor that is described by the factor information may be any factor that, in accordance with its psychological effect on the driver, tends to induce the driver to change the vehicle speed to a speed which the driver feels to be more appropriate and comfortable. Specifically, in any case where the driver feels a psychological stress or a psychological burden that makes the driver want to decrease the vehicle speed, the factor of the psychological stress or the psychological burden may serve as factor information. In a case where the driver feels that the vehicle speed must be maintained or accelerated in order to drive comfortably, that factor may serve as an item of factor information. In cases where it has been shown, for example, by statistics, that certain factors have a psychological effect on the driver, those factors may be defined in advance.

In the present embodiment, the factors that are included in the factor information include the slope and the length of a road with a descending slope that are determined based on the map information 30a, the friction coefficient of the road with the descending slope, the curvature of the descending slope and of the road in the vicinity of the descending slope, the lane in which the host vehicle is traveling, the presence of another vehicle ahead of the vehicle that is determined based on the image data output by the camera 44, and the braking force of the brake that is determined based on the signal that is output by the brake sensor 45a. A point value is assigned in advance to each of the factors for the purpose of computing a total value that expresses the degree of psychological effect on the driver. The point value is set, and the method of computing the point value is determined, such that the point value for the factor will increase the total value in correlation to the degree of psychological stress on the driver. A factor that requires the vehicle speed to be maintained or accelerated in order for the driver to drive comfortably is assigned a negative point value.

The overall psychological effect acquisition section 21c is a module that acquires the overall psychological effect on the driver when the vehicle is traveling on a road with a descending slope. Specifically, the control section 20 uses the processing by the overall psychological effect acquisition section 21c to acquire the overall psychological effect by acquiring the items of factor information that pertain to a descending slope that exists within a specified distance ahead of the vehicle, and by acquiring the total point value for the factors.

The vehicle speed control section 2 Id is a module that controls the speed of the vehicle by controlling one of any one of or a combination of the braking system 45, the gear shift mechanism 46, and the throttle control 47 in accordance with the overall psychological effect. Specifically, the control section 20 uses the processing by the vehicle speed control section 21d to output the control signal to the braking system 45 such that a desired braking force is applied to the vehicle. The control section 20 can also vary the gear ratio in the automatic gear shift unit by outputting the control signal to the gear shift mechanism 46 to switch the shift stage as desired. The control section 20 can also regulate the engine output by outputting the control signal to the throttle control 47 to adjust the opening of the throttle valve.

The present preferred embodiment is configured such that the control section 20, by controlling a combination of the braking system 45, the gear shift mechanism 46, and the throttle control 47, controls the vehicle speed by two methods when the vehicle is traveling on a road with a descending slope. Specifically, when the total point value that indicates the overall psychological effect is at least a specified threshold value, the control section 20 causes a degree of deceleration (acceleration in a direction opposite the vehicle's direction of travel) that will maintain the speed of vehicle on the descending slope. (This control is called a second control state.) When the total point value that indicates the overall psychological effect is less than the specified threshold value, the control section 20 controls deceleration such that the vehicle can be accelerated slightly on the descending slope. (This control is called a first control state.)

The configuration described above makes it possible to specify the overall psychological effect based on the various types of psychological effects on the driver of the vehicle that is traveling on the road with the descending slope and to control vehicle speed in accordance with the overall psychological effect. It is therefore possible to control the vehicle speed appropriately for the psychological state of the driver who is driving on the road with the descending slope.

(2) Driving Support Processing

Next, a preferred embodiment of the driving support method that is executed by the navigation device 10 of the configuration described above will be explained. The navigation device 10 (or CPU therein) is programmed with the navigation program 21 it executes, the navigation program 21 being shown in FIG. 2. In the present embodiment, the control states described above are designated by a variable DS. DS has an initial value of zero. In the second control state, DS equals 2, and in the first control state, DS equals 1. In the driving support method shown in FIG. 2, the control section 20 first initializes DS to zero (step S100).

Next, the control section 20 uses the processing of the factor information acquisition section 21b to acquire information on a road with a descending slope that exists ahead of the vehicle (step S110). Specifically, the control section 20 uses the processing of the vehicle position information acquisition section 21a to determine the current location of the vehicle based on the output signals from the GPS receiver 41 and the like, then refers to the map information 30a to determine whether or not a road with a descending slope exists within a specified distance ahead of the determined current location of the vehicle. In a case where a road with a descending slope does exist, the control section 20 uses the processing of the factor information acquisition section 21b to acquire, as the factor information, information that pertains to the road with the descending slope.

Figure 9:
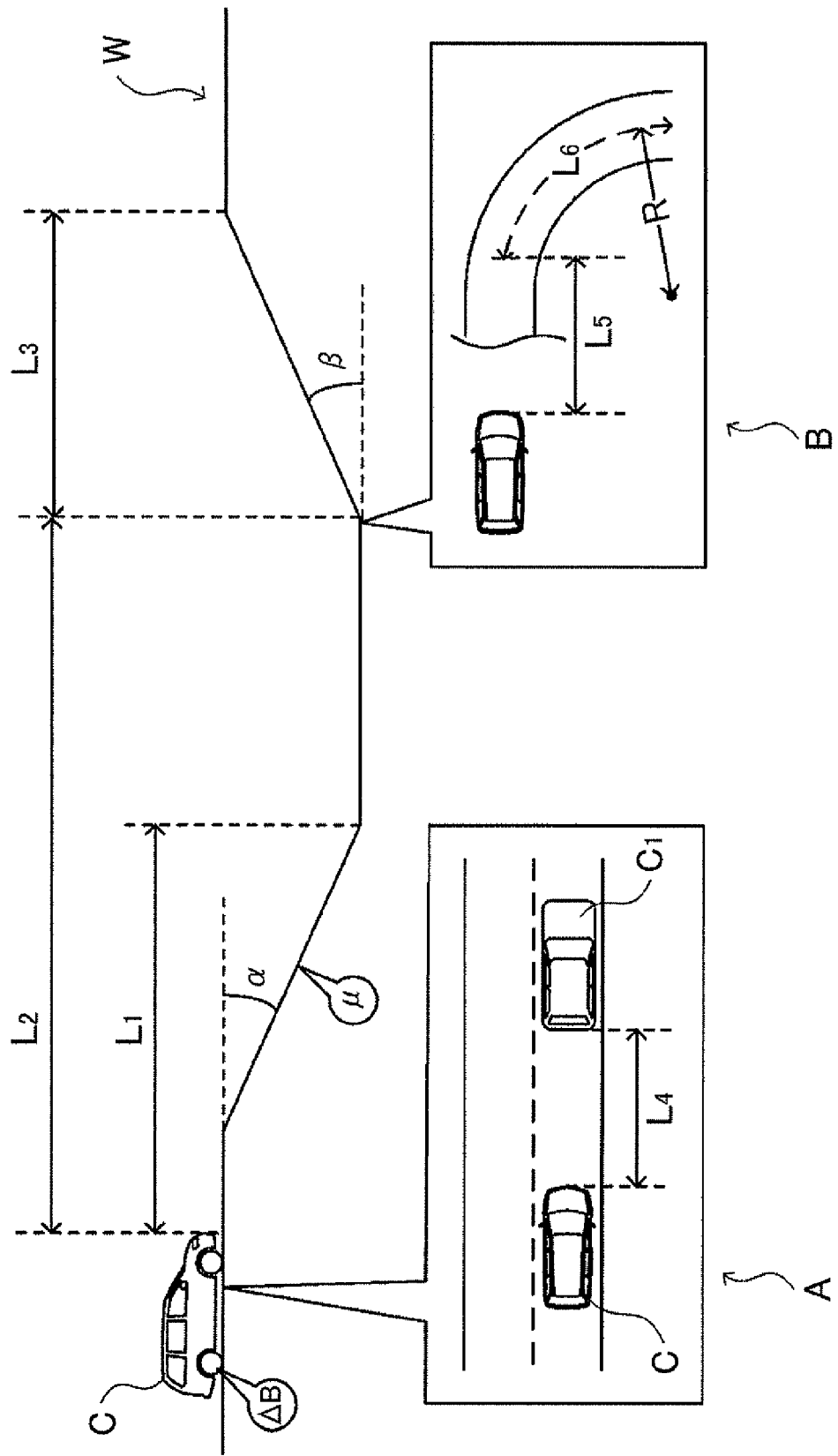
FIG. 9 illustrates examples of factors for which factor information is obtained.

FIG. 9 shows an example of the factor information used in the present embodiment. More specifically, FIG. 9 schematically shows a road W on which a descending slope, a flat section, and an ascending slope are formed in a continuous sequence ahead of a vehicle C. At step S110, the control section 20 refers to the map information 30a to acquire data that indicates the locations and the heights of the nodes and the interpolation points that exist within a specified distance ahead of the vehicle. The control section 20 then selects two successive points from among the nodes and the interpolation points along the road and determines whether or not the difference in their elevations indicates presence of a descending slope. In a case where a descending slope is found to exist, the inclination α of the descending slope (an angle in relation to the horizontal (with an angle below the horizontal assigned a positive value)) is determined based on the difference between the elevations. The processing that determines the difference between the elevations of the two successive points is then repeated until a point is located where the difference between the elevations of the two successive points is nearly zero. That point is then set as the end point of the descending slope. Next, a distance $L_1$ from the current location of the vehicle to the end point of the descending slope is determined.

Further, in the present embodiment, when a road with an ascending slope of a specified inclination exists ahead of the road with the descending slope, the control section 20 acquires information that indicates the ascending slope. For example, referring to the map information 30a, the control section 20 selects two successive points from among the nodes and the interpolation points that lie within a specified range ahead of the end point of the descending slope and determines whether or not an ascending slope exists based on the difference between their elevations. In a case where an ascending slope does exist, the control section 20 determines the starting point of the ascending slope by determining an inclination β of the ascending slope (an angle in relation to the horizontal (with an angle above the horizontal assigned a positive value)) based on the difference in the elevations. The processing that determines the difference between the elevations of the two successive points is then repeated until a point is located where the difference between the elevations of the two successive points is nearly zero. That point is then set as the end point of the ascending slope. Next, a distance $L_2$ from the current location of the vehicle to the start point of the ascending slope and a distance $L_3$ from the start point to the end point of the ascending slope are determined.

The control section 20 in the present embodiment also acquires information that indicates the braking force of the brake based on the output from the brake sensor 45a. The control section 20 specifies an extent (shown as ΔB in FIG. 9) to which the braking force will drop below a predetermined, specified state (for example, an initial state), then acquires that value as an item of factor information. Note that the extent ΔB of the drop in the braking force may be acquired by preparing in advance a data map in which values for ΔB are associated with values for the output from the brake sensor 45a (that is, the oil temperature).

Next, the control section 20 uses the processing by the factor information acquisition section 21b to acquire curvature information that indicates the curvature of one of the descending slope and the road in the vicinity of the descending slope (step S120). Specifically, the control section 20 refers to the map information 30a to acquire data that indicates the locations and the heights of the nodes and the interpolation points that exist within a specified distance ahead of the vehicle. The control section 20 then selects at least three successive points from among the nodes and the interpolation points along the road and determines the curvature of a hypothetical circle whose circumference passes through all three points. The control section 20 takes a section that has at least a specified degree of curvature and defines it as a curve section. The control section 20 then determines the radius of the curve section (shown as a radius R in the partial view B in FIG. 9), the distance between the start point of the curve section and the current location of the vehicle (shown as a distance $L_5$ in partial view B in FIG. 9), and the distance between the start point and the end point of the curve section (shown as a distance $L_6$ in partial view B in FIG. 9) and uses them as factor information.

Next, the control section 20 uses the processing by the factor information acquisition section 21b to acquire, by referring to the map information 30a, the node data for the nodes that are associated with the road with the descending slope for which information was acquired at step S110. The control section 20 takes the friction coefficient (shown as a friction coefficient μ in FIG. 9) and uses it as an item of factor information (step S130). The control section 20 also uses the processing by the factor information acquisition section 21b to acquire, based on the image data that is output by the camera 44, information on the area around the vehicle for use as factor information (step S140). The information on the area around the vehicle is information that indicates at least one of a relationship between the vehicle and the road around it and a relationship between the host vehicle and another vehicle.

In the present embodiment, the information that the control section 20 acquires for the relationship between the vehicle and the road around it includes information identifying the lanes in the road on which the vehicle is traveling. Specifically, the control section 20 acquires the node data by referring to the map information 30a, then determines whether or not a passing lane exists in the road on which the vehicle is traveling. If it is determined that a passing lane does exist, the control section 20 determines whether or not the vehicle is currently traveling in the passing lane, based on the image data that is output by the camera 44. If the vehicle is currently traveling in the passing lane, the control section 20 acquires information that indicates that the vehicle is currently traveling in the passing lane as an item of factor information. For example, partial view A in FIG. 9 shows an overhead view of the vehicle C that is traveling on a two-lane road. The camera 44 outputs the image data of the area ahead of the vehicle, which includes lines on the road to the left and right of the vehicle. Based on the imaged lines, the control section 20 determines the lane in which the vehicle is traveling. For example, in a case where the vehicle is traveling in the right lane on a two-lane road, a straight line exists on the right side of the vehicle. If a broken line exists on the left side of the vehicle, it can be determined that the vehicle is traveling in the right lane (that is, the passing lane in a country where vehicles are driven on the left side of the road).

The information that the control section 20 acquires pertaining to the relationship between the host vehicle and another vehicle, based on the image data that is output by the camera 44, includes the distance between the host vehicle C and another vehicle $C_1$ (shown as a distance $L_4$ in partial view A in FIG. 9) and the relative speed S of the other vehicle C1 to the host vehicle C (the speed of the other vehicle $C_1$ minus the speed of the host vehicle C).

Once the various items of factor information have been acquired as described above, the control section 20 uses the processing by the overall psychological effect acquisition section 21c to determine the overall psychological effect based on the various factors in the factor information (step S150). Next, the control section 20 uses the processing by the vehicle speed control section 21d to specify the control state based on the overall psychological effect (step S160) and to execute the vehicle speed control subroutine based on the control state (step S170). Next, the control section 20 acquires an output signal from the ignition switch and determines whether or not the ignition switch is off (step S180). The processing from step 110 onward is repeated until it is determined that the ignition switch is off.

(2-1) Overall Psychological Effect Acquisition Processing

Figure 3:
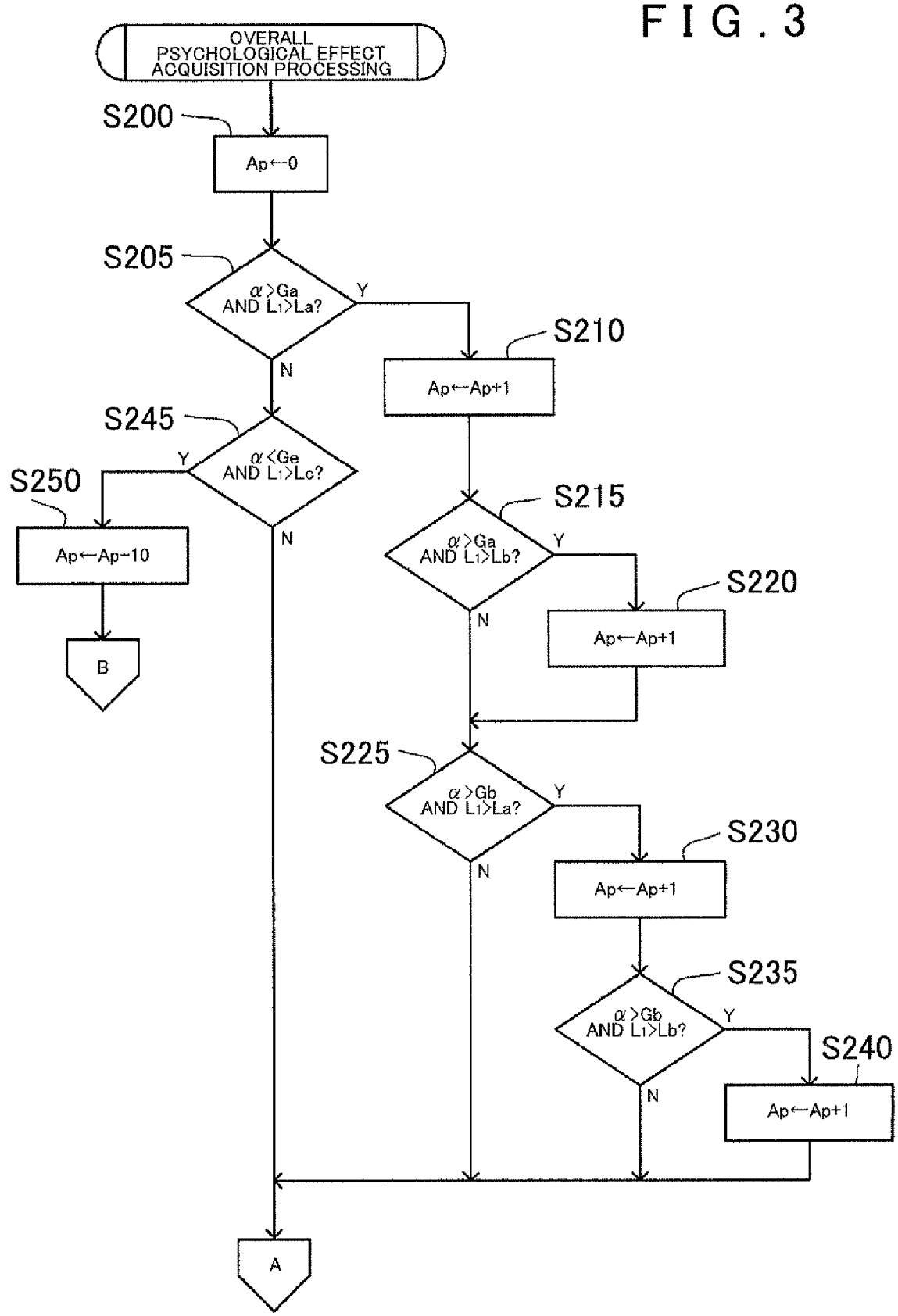
FIG. 3 is a partial flowchart of a subroutine for overall psychological effect acquisition processing (step S150 in FIG. 2)
Figure 4:
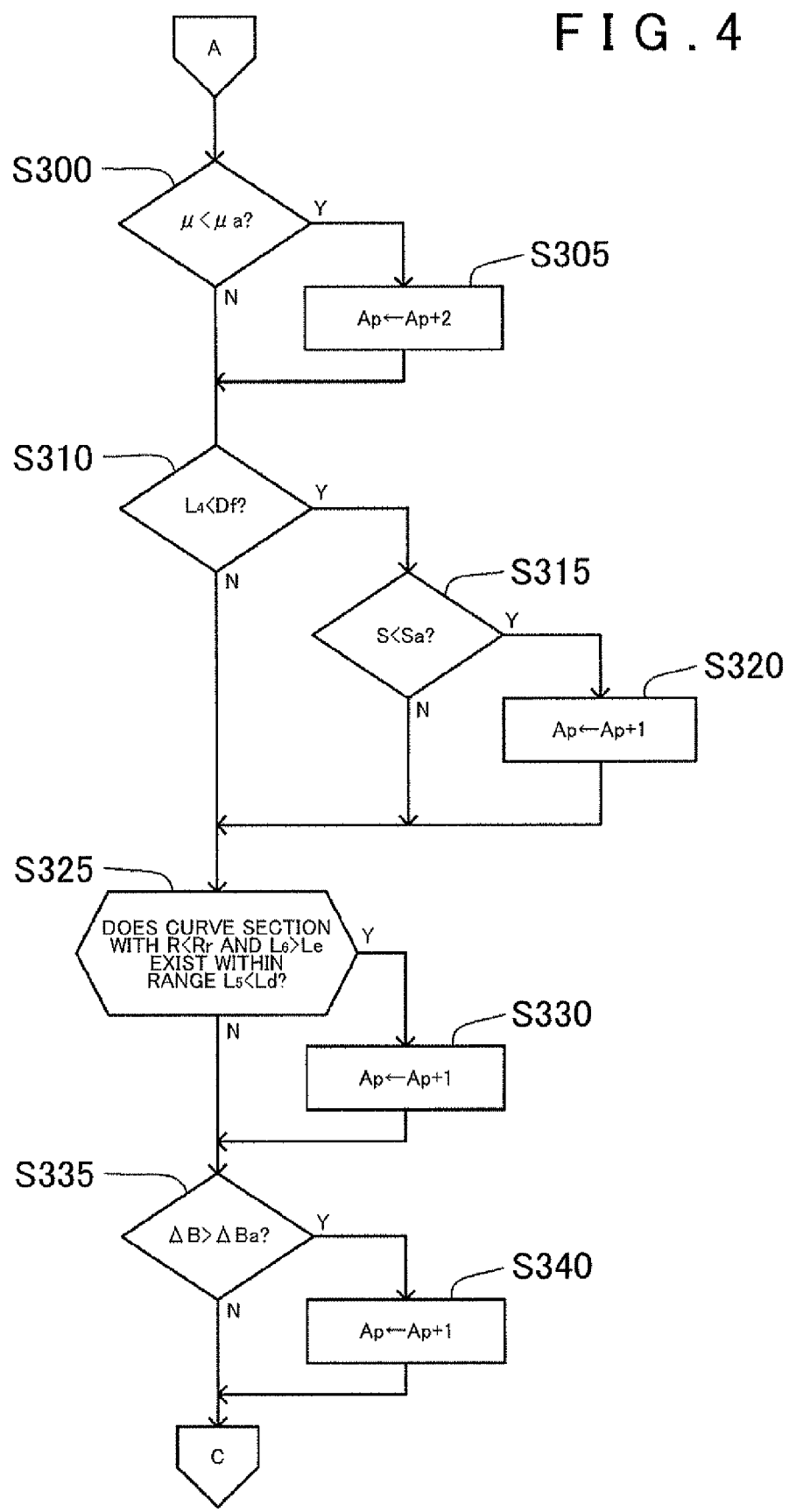
FIG. 4 is a continuation of the flowchart of FIG. 3.
Figure 5:
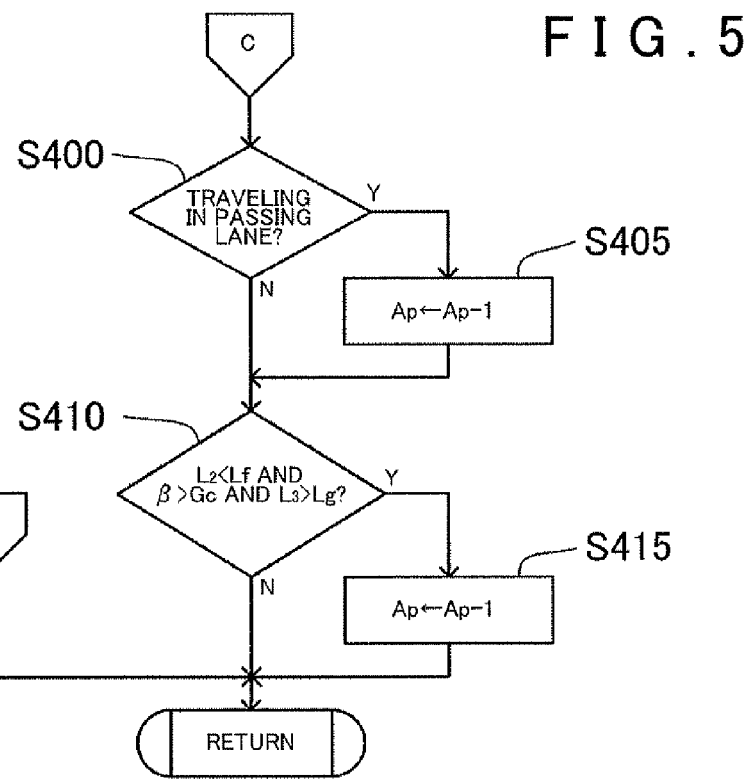
FIG. 5 is a further continuation of the flowchart of FIGS. 3 and 4.

FIGS. 3 to 5 are flowcharts that show the overall psychological effect acquisition processing in step S150. In the overall psychological effect processing that is shown in FIG. 3, the control section 20 initializes to zero a variable Ap that indicates the overall psychological effect (step S200). In the present embodiment, threshold values are set in advance for the items of factor information that are acquired as described above. Each item of factor information is compared to the corresponding threshold value, and based on the result, the value of the variable Ap is increased by 1 or 2 and decreased by 1 or 10. The variable Ap serves as a point total that corresponds to the overall psychological effect.

For this purpose, the control section 20 acquires pre-set threshold values Ga and La, respectively, for the inclination $\alpha$ of the descending slope and the distance $L_1$ from the current location of the vehicle to the end point of the descending slope. The control section 20 then determines whether or not the inclination $\alpha$ is greater than Ga and whether or not the distance $L_1$ is greater than La (step S205). That is, the control section 20 determines whether or not a descending slope with an inclination that is steeper than Ga exists ahead of the vehicle and whether or not the descending slope extends farther from the current location than the distance La.

If it is determined at step S205 that the inclination $\alpha$ is greater than Ga and the distance $L_1$ is greater than La, the value of the variable Ap is updated by adding 1 to it (step S210). In other words, the fact that an inclination that is steeper than Ga exists and extends farther than the distance La is regarded as imposing psychological stress on the driver, so the value of the variable Ap is increased by 1.

Next, the control section 20 acquires a pre-set threshold value Lb for the distance $L_1$ and determines whether or not the inclination $\alpha$ is greater than Ga and whether or not the distance $L_1$ is greater than Lb (step S215). That is, the control section 20 determines whether or not a descending slope with an inclination that is steeper than Ga exists ahead of the vehicle and whether or not the descending slope extends farther from the current location than the distance Lb. In this case, the distance Lb is greater than the distance La. If it is determined in step S215 that the inclination $\alpha$ is greater than Ga and the distance $L_1$ is greater than Lb, the value of the variable Ap is updated by adding 1 to it (step S220). In other words, if the descending slope in question has a distance that imposes a greater psychological stress on the driver than does the descending slope as evaluated by the conditions for step S205, the variable Ap is updated in step S220. Note that once step S220 is executed, the value of the variable Ap is increased by 2 over the initial value. If it is not determined in step S215 that the inclination $\alpha$ is greater than Ga and the distance $L_1$ is greater than Lb, step S220 is skipped.

Next, the control section 20 acquires a pre-set threshold value Gb for the inclination $\alpha$ and determines whether or not the inclination $\alpha$ is greater than Gb and whether or not the distance $L_1$ is greater than La (step S225). That is, the control section 20 determines whether or not a descending slope with an inclination that is steeper than Gb exists ahead of the vehicle and whether or not the descending slope extends farther from the current location than the distance La. In this case, the inclination Gb is greater than the inclination Ga. If it is determined in step S225 that the inclination $\alpha$ is greater than Gb and the distance $L_1$ is greater than La, the value of the variable Ap is updated by adding 1 to it (step S230). In other words, if the descending slope in question has an inclination that imposes a greater psychological stress on the driver than does the descending slope as evaluated by the conditions for step S205, the variable Ap is updated in step S230. Note that once step S230 is executed, the value of the variable Ap is increased by either 3 or 2 over the initial value. If it is not determined in step S225 that the inclination $\alpha$ is greater than Gb and the distance $L_1$ is greater than La, step S230 and subsequent steps are skipped.

Next, the control section 20 determines whether or not the inclination $\alpha$ is greater than Gb and whether or not the distance $L_1$ is greater than Lb (step S235). That is, the control section 20 determines whether or not a descending slope with an inclination that is steeper than Gb exists ahead of the vehicle and whether or not the descending slope extends farther from the current location than the distance Lb. If it is determined at step S235 that the inclination $\alpha$ is greater than Gb and the distance $L_1$ is greater than Lb, the value of the variable Ap is updated by adding 1 to it (step S240). In other words, if the descending slope in question has both an inclination and a distance that impose a greater psychological stress on the driver than does the descending slope as evaluated by the conditions for steps S205, S215 and S225, the variable Ap is updated in step S240. Note that once step S240 is executed, the value of the variable Ap is increased by 4 over the initial value. If it is not determined in step S235 that the inclination $\alpha$ is greater than Gb and the distance $L_1$ is greater than Lb, step S240 is skipped.

On the other hand, if it is not determined in step S205 that the inclination $\alpha$ is greater than Ga and the distance $L_1$ is greater than La, the control section 20 acquires a pre-set threshold value Ge for the inclination $\alpha$ and a pre-set threshold value Lc for the distance $L_1$, then determines whether or not the inclination $\alpha$ is less than Ge and whether or not the distance $L_1$ is greater than Lc (step S245). That is, the control section 20 determines whether or not a descending slope with an inclination that is less steep than Ge exists ahead of the vehicle and whether or not the descending slope extends farther from the current location than the distance Lc. In this case, the inclination Ga is greater than the inclination Ge. If it is determined in step S245 that the inclination $\alpha$ is less than Ge and the distance $L_1$ is greater than Lc, the value of the variable Ap is updated by subtracting 10 from it (step S250). In other words, in the present embodiment, if the inclination $\alpha$ is less than Ge, the descending slope is regarded as not being so steep as to impose psychological stress on the driver, so the value of the variable Ap is decreased by 10, which is a large absolute value.

FIG. 4 is a flowchart that shows the processing that follows the indicator A shown in FIG. 3. In the processing shown in this flowchart, the control section 20 acquires a pre-set threshold value μa for the friction coefficient μ and determines whether or not the friction coefficient μ is less than μa (step S300). That is, the control section 20 determines whether or not the friction coefficient μ for the road with the descending slope is less than μa, a value that imposes psychological stress on the driver. If it is determined at step S300 that the friction coefficient μ is less than μa, the value of the variable Ap is updated by adding 2 (step 8305). If it is determined at step S300 that the friction coefficient μ is not less than μa, step S305 is skipped.

Next, the control section 20 acquires a pre-set threshold value Df for the distance $L_4$ between the host vehicle and the other vehicle and a pre-set threshold value Sa for the relative speed S of the other vehicle to the host vehicle, then determines whether or not the distance $L_4$ is less than Df (step S310). If it is determined in step S310 that the distance $L_4$ is less than Df, the control section 20 determines whether or not the relative speed S is less than Sa (step S315). That is, the control section 20 determines whether or not the distance between the host vehicle and the other vehicle is short and whether or not psychological stress is imposed on the driver by the speed of the other vehicle relative to the host vehicle. If it is determined in step S315 that the relative speed S is less than Sa, the value of the variable Ap is updated by adding 1 (step S320). If it is determined in step S310 that $L_4$ is not less than Df, steps S315 and S320 are skipped. If it is determined that the relative speed S is not less than Sa, step S320 is skipped.

Next, the control section 20 acquires pre-set threshold values Ld, Rr, and Le, respectively, for the distance $L_5$ between the start point of the curve section and the current location of the vehicle, the radius R of the curve section, and the distance $L_6$ between the start point and the end point of the curve section. Next, the control section 20 determines whether or not the distance $L_5$ is less than Ld, the radius R is less than Rr, and the distance $L_6$ is greater than Le (step S325). That is, in a case where a curve section exists within the distance Ld from the vehicle, and the radius R of the curve section is less than Rr, and the curve section is longer than the distance Le, the curve section is regarded as imposing psychological stress on the driver. Note that the distance Ld is a typical value for a range within which a curve section that imposes psychological stress on the driver of the vehicle can be visually recognized. Further, the radius Rr is a typical value for a radius of a curve section that imposes psychological stress on the driver, and the distance Le is a typical value for a length of a curve section that imposes psychological stress on the driver. If it is determined at step S325 that the distance $L_5$ is less than Ld, the radius R is less than Rr, and the distance $L_6$ is greater than Le, the value of the variable Ap is updated by adding 1 (step S330). If it is not determined at step S325 that the distance $L_5$ is less than Ld, the radius R is less than Rr, and the distance $L_6$ is greater than Le, step S330 is skipped.

Next, the control section 20 acquires a pre-set threshold value ΔBa for the extent ΔB to which the braking force of the brake will drop below the specified state, then determines whether or not the extent of drop ΔB is greater than ΔBa (step S335). That is, by determining whether or not the extent ΔB of the drop in the braking force of the brake exceeds ΔBa, the control section 20 determines whether or not the drop in the braking force of the brake is of an extent that will impose psychological stress on the driver. If it is determined at step S335 that the extent of drop ΔB is greater than ΔBa, the value of the variable Ap is updated by adding 1 (step S340). If it is determined in step S335 that the drop extent ΔB is not greater than ΔBa, step S340 is skipped.

FIG. 5 is a flowchart that shows the processing that follows the indicator B shown in FIG. 3 and the indicator C shown in FIG. 4. In the processing shown in this flowchart, the control section 20 determines whether or not the vehicle is traveling in a passing lane (step S400). If the vehicle is traveling in a passing lane, it is assumed that the driver is not driving in a passive manner and that the psychological stress or burden is low. Therefore, if it is determined at step S400 that the vehicle is traveling in a passing lane, the value of the variable Ap is updated by subtracting 1 from it (step S405). If it is determined at step S400 that the vehicle is not traveling in a passing lane, step S405 is skipped.

Next, the control section 20 acquires pre-set threshold values Lf, Lg, and Gc, respectively, for the distance $L_2$ from the current location of the vehicle to the start point of the ascending slope, the distance $L_3$ from the start point to the end point of the ascending slope, and the inclination β of the ascending slope. The control section 20 then determines whether or not the distance $L_2$ is less than Lf, the inclination β is greater than Gc, and the distance $L_3$ is greater than Lg (step S410). That is, in a case where an ascending slope with an inclination that is steeper than Cc exists within the distance Lf ahead of the vehicle, and the ascending slope section is longer than the distance Lg, the ascending slope section is regarded as imparting a sense of security to the driver, so the psychological burden is lessened. Note that the distance Lf is a typical value for a range within which an ascending slope that can reduce the psychological burden on the driver of the vehicle can be visually recognized. Further, the inclination β is a typical value for an inclination of an ascending slope that follows a descending slope and reduces psychological stress on the driver, and the distance Lg is a typical value for a length of an ascending slope that reduces psychological stress on the driver. If it is determined in step S410 that the distance $L_2$ is less than Lf, the inclination β is greater than Gc, and the distance $L_3$ is greater than Lg, the value of the variable Ap is updated by subtracting 1 from it (step S415). If it is not determined at step S410 that the distance $L_2$ is less than Lf, the inclination β is greater than Gc, and the distance $L_3$ is greater than Lg, step S415 is skipped.

Figure 2:
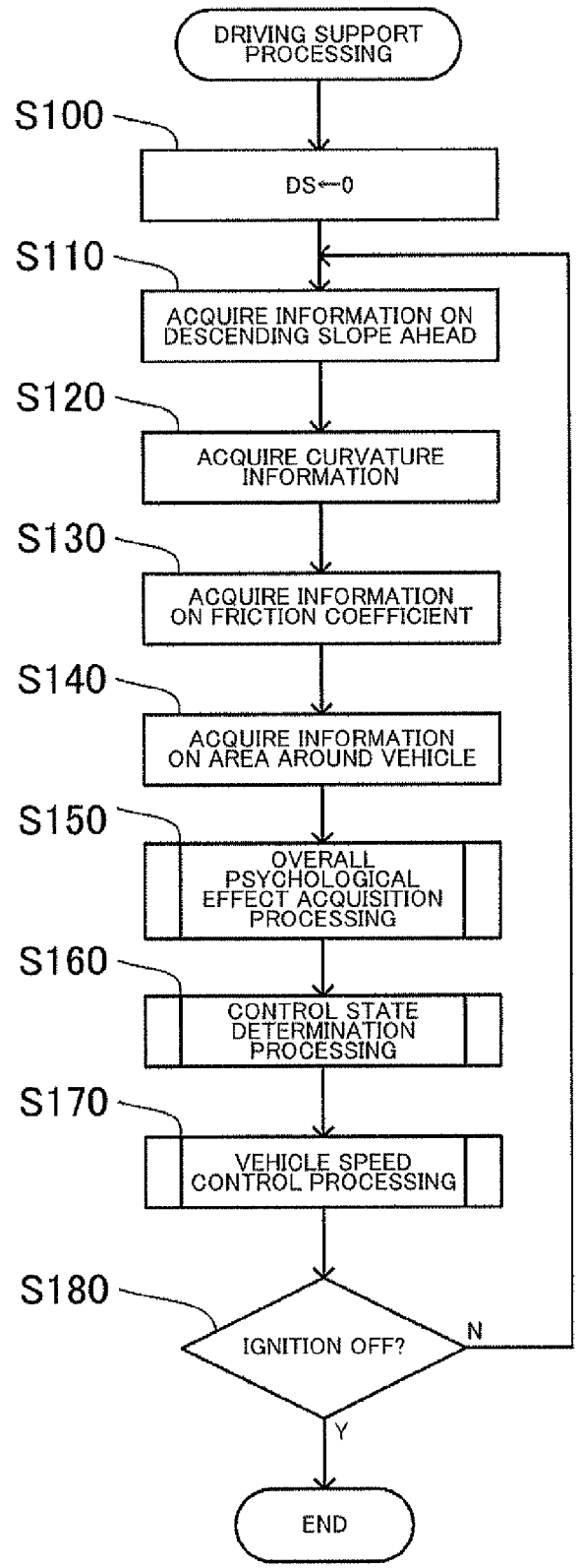
FIG. 2 is a flowchart of the driving support method of the present invention.

If step S415 described above is executed, or if step S250 is executed and it is not determined at step S410 that the distance $L_2$ is less than Lf, the inclination β is greater than Gc, and the distance $L_3$ is greater than Lg, the overall psychological effect acquisition processing is terminated, and the execution returns to the processing shown in FIG. 2.

(2-2) Control State Determination

Figure 6:
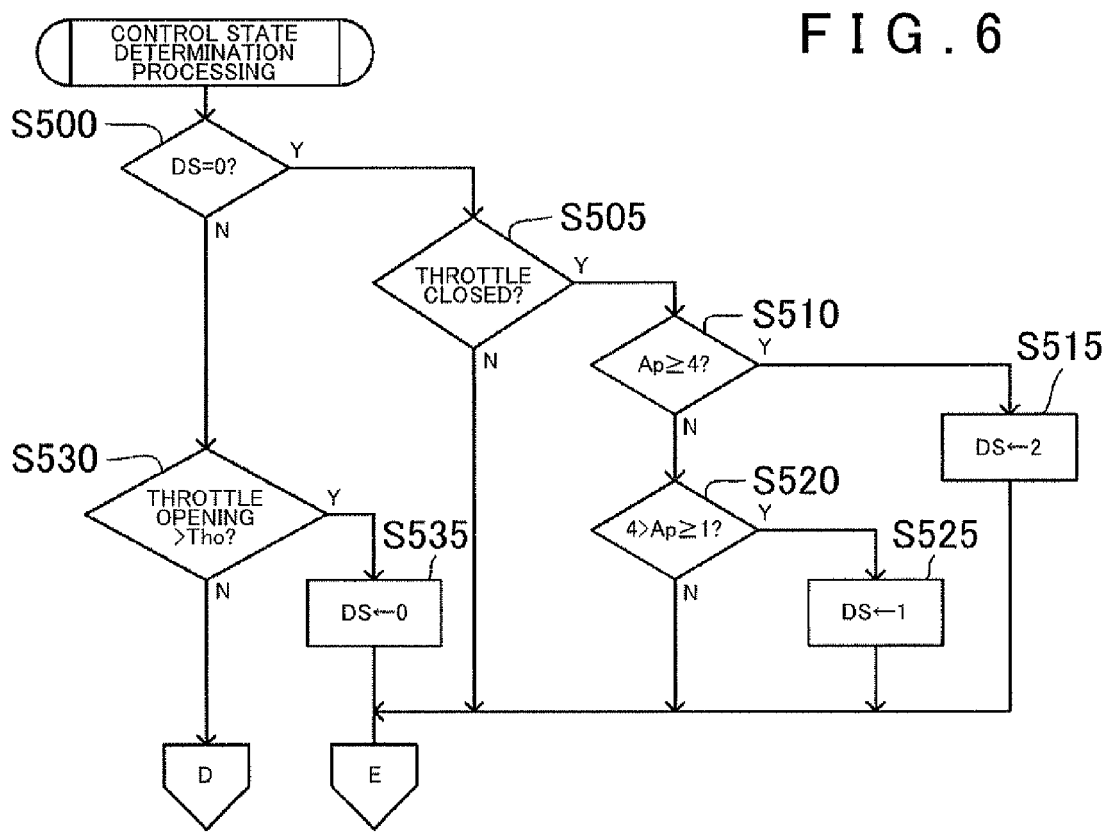
FIG. 6 is a partial flowchart of a subroutine for control state determination processing (step S160 in FIG. 2)

FIG. 6 is a flowchart that shows the control state determination subroutine of step S160. In the control state determination processing that is shown in FIG. 6, the control section 20 determines whether or not the variable DS that indicates the control state is set to zero (step S500). If it is determined in step S500 that the variable DS is set to zero, the control section 20 determines whether or not the vehicle's throttle is closed under control of the throttle control 47 (step S505). For example, the control section 20 may determine whether or not the current throttle is completely closed based on the record of the control signals to the throttle control 47.

If it is determined in step S505 that the throttle is in a closed state, the processing of step S510 and subsequent steps is performed to set DS to one 1 or 2. Specifically, the throttle is regarded as closed when the throttle is in a state in which the driver is trying to decelerate (a state in which there is an intention to decelerate). In the state in which there is an intention to decelerate, the control state is set to either the second control state, in which the speed of the vehicle is maintained on a descending slope, or the first control state, in which the vehicle is allowed to accelerate slightly on a descending slope.

In order to set the control state, the control section 20 first determines whether or not the variable Ap that indicates the overall psychological effect is at least a specified threshold value (4 in the example shown in FIG. 6) (step S510). If it is determined that the variable Ap is at least the specified threshold value, the control section 20 sets DS to 2 (step S515). If it is determined in step S510 that the variable Ap is not at least the specified threshold value, the control section 20 determines whether or not the variable Ap is at least 1 and less than the specified threshold value (step S520). If it is determined that the variable Ap is at least 1 and less than the specified threshold value, DS is set to 1 (step S525). If it is not determined that the variable Ap is at least 1 and less than the specified threshold value, step S525 is skipped. Note also that if it is determined in step S505 that the throttle is not in a closed state, steps S510 to S525 are skipped.

In other words, if the variable Ap is at least the specified threshold value, the overall psychological stress that is imposed on the driver is deemed to be comparatively strong, and DS is set to 2, thus setting the control state to maintain the vehicle speed and not to accelerate on a descending slope. If the variable Ap is at least 1 and less than the specified threshold value, the overall psychological stress that is imposed on the driver is deemed to be comparatively weak, and DS is set to 1, thus setting the control state to allow the vehicle to accelerate slightly on a descending slope.

On the other hand, if it is determined at step S500 that the variable DS is not set to zero, the control section 20 determines whether or not to change the control state. To do this, the control section 20 first determines whether or not the throttle opening has been set to greater than a specified threshold value Tho under the control of the throttle control 47 (step S530). If it is determined in step S530 that the throttle opening is greater than the specified threshold value, DS is set to zero (step S535). If it is determined in step S530 that the throttle opening is not greater than the specified threshold value, step S535 is skipped. In other words, the control section 20 determines whether or not the driver intends to decelerate, and if it is determined that the driver does not intend to decelerate, the control section 20 sets the control state to zero, thus setting a state in which the driver can control the vehicle speed as he desires (automatic speed control is OFF).

Figure 7:
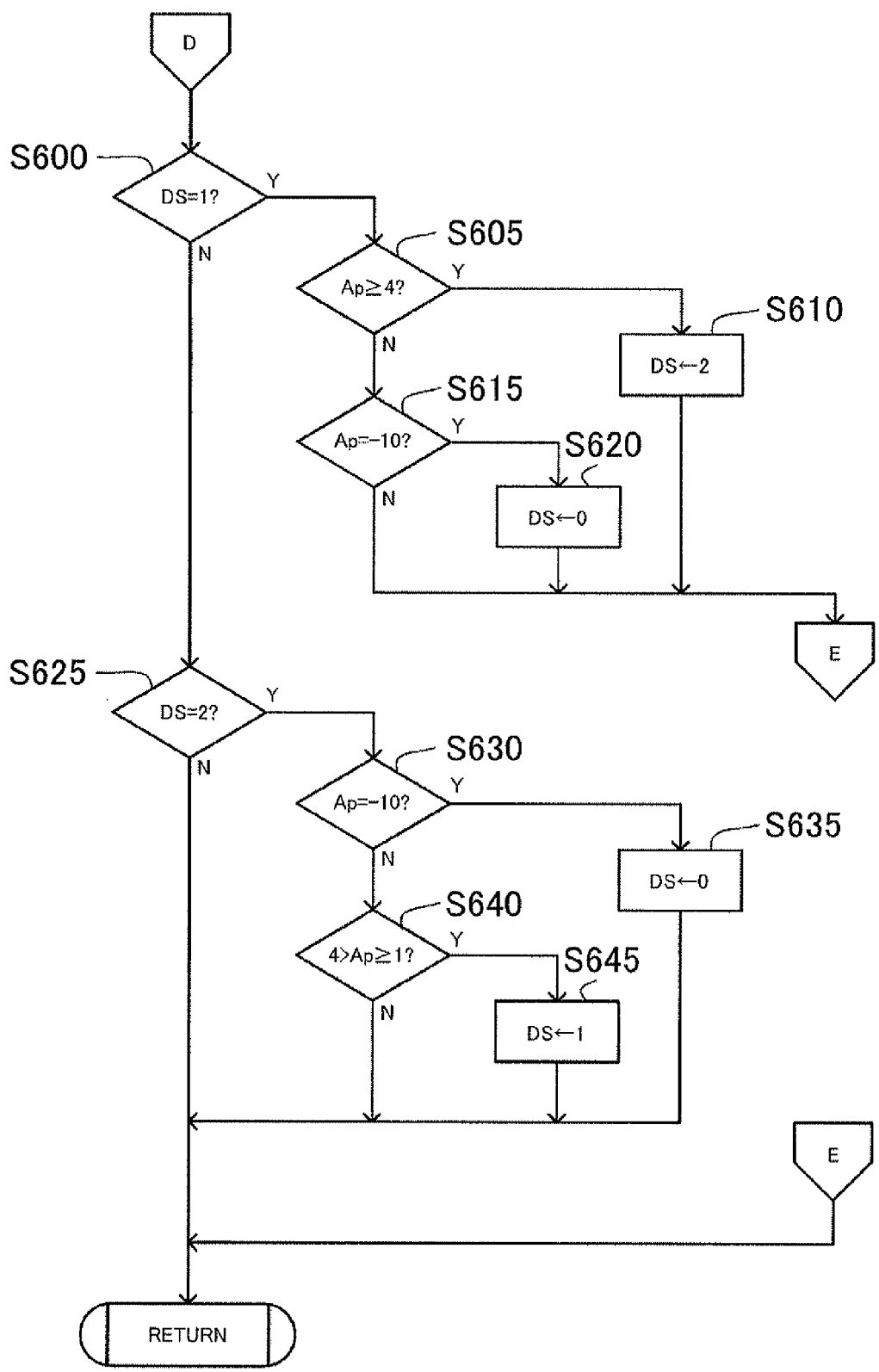
FIG. 7 is a continuation of the flowchart of FIG. 6.

FIG. 7 is a flowchart that shows the processing that follows the indicators D and E shown in FIG. 6. In the processing shown in this flowchart, the control section 20 determines whether or not the variable DS that indicates the control state is set to 1 (step S600). If it is determined in step S600 that the variable DS is set to 1, the control section 20 first determines whether or not the variable Ap, that indicates the overall psychological effect, is at least a specified threshold value (4 in the example shown in FIG. 7) (step S605). If the variable Ap is at least the specified threshold value, the control section 20 sets DS to 2 (step S610).

If it is determined in step S605 that the variable Ap is not at least the specified threshold value, the control section 20 determines whether or not the variable Ap is set to −10 (step S615). If it is determined that the variable Ap is set to −10, the control section 20 sets DS to zero (step S620). If it is determined that the variable Ap is not set to −10, step S620 is skipped. In other words, based on the variable Ap, the control section 20 determines whether the control state should be set to either 2 or zero, then sets DS accordingly.

Next, the control section 20 determines whether or not the variable DS that indicates the control state is set to 2 (step S625). If it is determined in step S625 that the variable DS is set to 2, the control section 20 determines whether or not the variable Ap is set to −10 (step S630). If it is determined that the variable Ap is set to −10, the control section 20 sets DS to zero (step S635). If it is determined that the variable Ap is not set to −10, the control section 20 determines whether or not the variable Ap is at least 1 and less than the specified threshold value (step S640). If it is determined in step S640 that the variable Ap is at least 1 and less than the specified threshold value, the control section 20 sets DS to 1 (step S645). If it is not determined in step S640 that the variable Ap is at least 1 and less than the specified threshold value, step S645 is skipped. Once the processing described above is performed, the control state determination processing is terminated, and the processing returns to the main routine shown in FIG. 2.

(2-3) Vehicle Speed Control

Figure 8:
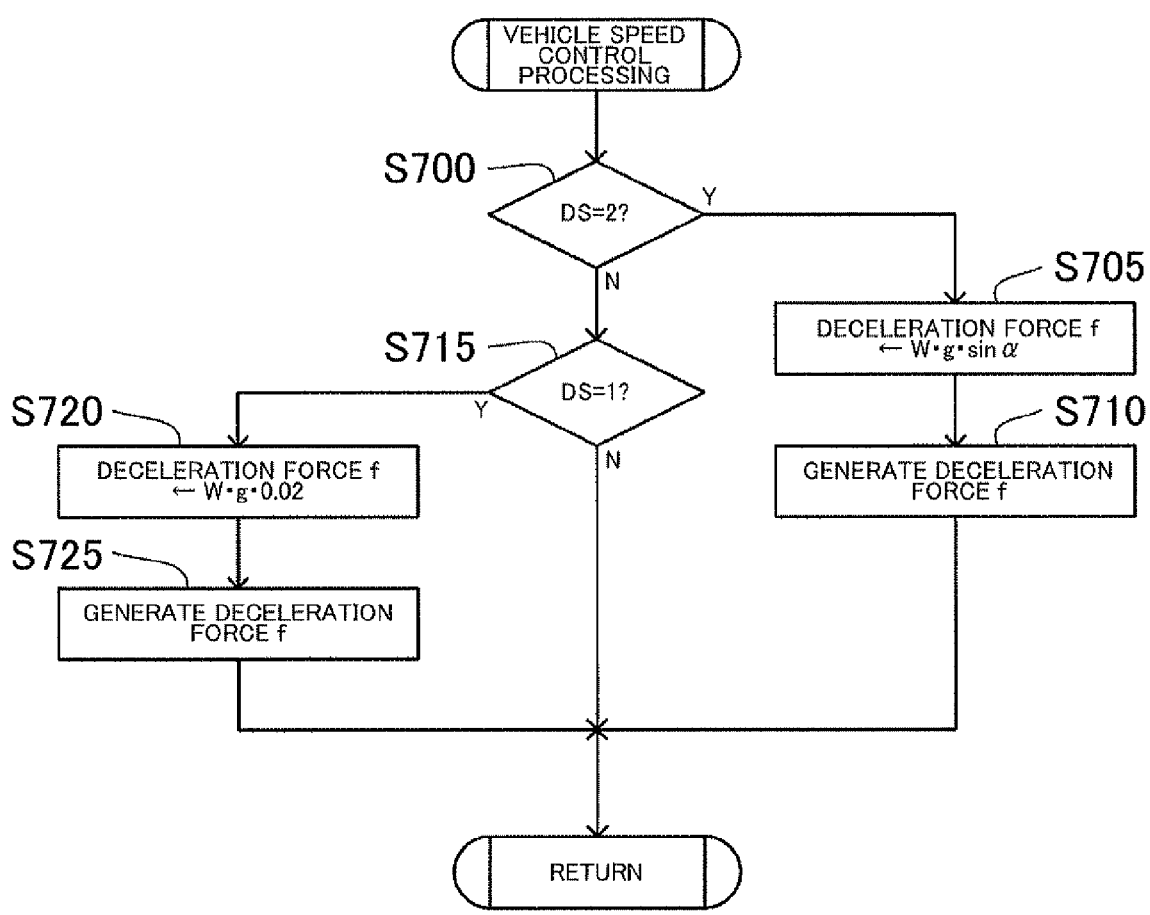
FIG. 8 is a flowchart of a subroutine for vehicle speed control processing (step S170 in FIG. 2)

FIG. 8 is a flowchart that shows the vehicle speed control subroutine of step S170 In the vehicle speed control subroutine that is shown in FIG. 8, the control section 20 determines whether or not the variable IDS that indicates the control state is set to 2 (step S700). If it is determined at step S700 that the variable DS is set to 2, the control section 20 determines a deceleration force f for maintaining the speed of the vehicle on a descending slope (step S705). The present embodiment is configured such that the speed of the vehicle is maintained by causing a force to act on the vehicle that corresponds to a deceleration (acceleration in the opposite direction) that counterbalances the acceleration in the forward direction that acts on the vehicle. The force that acts on the vehicle in the forward direction is expressed as W·g·sin α (where W is the weight of the vehicle and g is the acceleration of gravity). Accordingly, the present embodiment is configured such that it causes a deceleration force to act on the vehicle that is of the same magnitude as the force in the forward direction. The processing takes the inclination α of the descending slope, the predetermined weight of the vehicle, and the acceleration of gravity, then substitutes W·g·sin α for the deceleration force f. Obviously, the deceleration force f acts on the vehicle in a rearward direction.

Once the deceleration force f is specified, the control section 20 controls the braking system 45, the gear shift mechanism 46, and the throttle control 47 to generate the deceleration force f on the vehicle (step S710). For example, the control section 20 may execute control by outputting a control signal to the throttle control section 47 to completely close the throttle. The control section 20 may also acquire an appropriate gear ratio for generating the deceleration force f from a predetermined data map or the like, then cause a gear shift to that gear ratio by outputting a control signal to the gear shift mechanism 46. The control section 20 may also acquire a force F that acts on the vehicle through engine braking at that gear ratio, then control the braking system 45 such that a deceleration force is generated that is equivalent to the difference between the deceleration force f and the force F.

Obviously, the foregoing are only examples, and it is also possible to use the throttle control 47 to open the throttle, for example. Whatever method is used, it is possible for the driver to continue driving without feeling an excessive psychological burden, because the vehicle speed is automatically maintained by the control described above, even in a situation where travel on a road with a descending slope imposes a comparatively great psychological stress on the driver. Once step S710 is completed, the vehicle speed control subroutine is terminated, and the control section 20 returns to the main routine shown in FIG. 2.

On the other hand, if it is determined at step S700 that the variable DS is not set to 2, the control section 20 determines whether or not the variable DS is set to 1 (step S715). If it is determined at step S715 that the variable DS is set to 1, the vehicle speed control subroutine is terminated, and the control section 20 returns to the main routine shown in FIG. 2. If it is determined at step S715 that the variable DS is not set to 1, the control section 20 determines the deceleration force f for slightly accelerating the vehicle on a descending slope (step S720). The present embodiment allows the vehicle to be accelerated slightly by causing a deceleration force that is equivalent to a fixed deceleration (0.02 g) to act on the vehicle, thus limiting the acceleration. W·g·0.02 is substituted for the deceleration force f.

Once the deceleration force f is specified, the control section 20 controls the braking system 45, the gear shift mechanism 46, and the throttle control 47 to cause the deceleration force f to act on the vehicle (step S725). The control method may be the same as that used at step S710 above or a different control method may be used. Whatever method is used, it is possible for the driver to continue driving without feeling an excessive psychological burden, because the control described above keeps the vehicle speed from accelerating excessively in a situation where travel on a road with a descending slope imposes a comparatively great psychological stress on the driver. Once step S725 is completed, the vehicle speed control subroutine is terminated, and the processing returns to the main routine shown in FIG. 2.

(3) Other Embodiments

The present embodiment described above is only one example for practicing the present invention, and various other embodiments may be used so long as they control the vehicle speed based on the overall psychological effect that is imposed on the driver. For example, the factor information that is used may include various types of factors other than those described above. That is, the factor information may include any factor that imposes a psychological effect on the driver, such as information that indicates a state of at least one of the road with the descending slope and the roads in the vicinity of that road. It is not essential to combine the inclination and the distance of the descending slope as described above, and separate determinations may be made as to whether or not the inclination and the distance have psychological effects. A curve section that precedes the road with the descending slope and a curve section that exists on the road with the descending slope may also be treated as factors that impose a psychological effect on the driver. The factor information may also include information for a road before or after the road with the descending slope, the information indicating at least one of an inclination angle, a distance, a friction coefficient, a curvature, and relationship to the road with the descending slope (a difference in the relative inclination angles or the like). Obviously, in addition to a configuration in which a relationship between the vehicle and the road is evaluated according to distance, the present invention may be configured such that the relationship is evaluated according to a time or the like that is required for the vehicle to reach a specified location (the start point of the descending slope or the like).

Even in a case where the factor information includes information that indicates presence of another vehicle in the vicinity of the host vehicle, the factors of the distance between the two vehicles, and the relative speed of the vehicles, may be treated as separate items of factor information. A determination as to whether or not to use these factors may also be made based on the other vehicle's direction of travel. Furthermore, in a case where the braking force of the brake is used as a factor, instead of using oil temperature as factor information indicating brake fade, brake fade may be based on a decrease in the thickness of the brake pad, on an inadequate volume of oil, or the like. Obviously, various types of sensors can be used in the foregoing alternative techniques for determination of brake fade. In addition, in a case where the extent to which the braking force will drop below the predetermined, specified state is determined, the specified predetermined state is not limited to the initial state. Various other standards may also be used, such as making the specified predetermined state a state in which a specific degree of deterioration has occurred in a specific consumable part or the like.

The overall psychological effect may also be determined as a composite psychological effect that is due to a plurality of factors that pertain to the road with the descending slope, based on the factor information for each of the plurality of factors. Therefore, the overall psychological effect can be evaluated by various types of units. The overall psychological effect may be evaluated as a numerical value that corresponds to the degree of the psychological effect, and the degree of the psychological effect may also be evaluated in terms of different levels (high, medium, low, and the like).

The aforementioned two control states for control of the vehicle speed may be used, but a configuration in which a larger number of control states may also (additionally) be used, with the control being switched between the two configurations according to whether or not a psychological effect is felt. A difference between the current vehicle speed and a target vehicle speed may also be defined in relative ways such that the vehicle speed is maintained, accelerated, or the like, and a configuration may also be used that controls the deceleration force and the acceleration force such that a predetermined target speed is achieved. The forces that act on the vehicle may also be evaluated more precisely. For example, the coefficient of the friction between the vehicle tires and the road surface, as well as another form of resistance that acts on the vehicle, may be added to the evaluation. Further, computation of the deceleration force f is not limited to the procedure described above. For example, the deceleration force in the first control state may be determined by multiplying the deceleration force in the second control state by a set factor (the factor being greater than zero and less than 1). Obviously, the applications of the present invention are not limited to a vehicle in which the driving force of an internal combustion engine is transmitted to wheels through an automatic gear shift unit with a plurality of gear ratios. The present invention may also be applied to a vehicle that is equipped with a motor and to a vehicle that is equipped with a continuously variable transmission.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving support device, comprising:
   a factor information acquisition unit that acquires an item of factor information for each of plural factors that impose a psychological effect on a driver of a vehicle when the vehicle is traveling on a road with a descending slope ahead of the vehicle;
   an overall psychological effect acquisition unit that, based on the acquired items of factor information, acquires an overall psychological effect that is imposed on the driver when the vehicle is traveling on the road with the descending slope; and
   a vehicle speed control unit that controls the vehicle speed in accordance with the overall psychological effect; and
   wherein:
   the plural factors are selected from:
   a state of the road with the descending slope,
   a state of a road in the vicinity of the road with the descending slope,
   a state of another vehicle in the vicinity of the vehicle, a state in which a braking force of a brake that is installed in the vehicle has dropped below a specific force, the relationship between the vehicle and the road, and the overall psychological effect acquisition unit is adapted to acquire a degree of psychological stress for each acquired item of factor information and to acquire, as the overall psychological effect, a total of the degrees of psychological stress for all of the acquired items of factor information.

2. A driving support method, comprising the steps of:

acquiring an item of factor information indicative for each of plural factors that impose a psychological effect on a driver of a vehicle when the vehicle is traveling on a road with a descending slope ahead of vehicle;

acquiring, based on the acquired items of factor information, an overall psychological effect that is imposed on the driver when the vehicle is traveling on the road with the descending slope; and controlling the vehicle speed in accordance with the acquired overall psychological effect; and wherein:

the plural factors are selected from:
   a state of the road with the descending slope,
   a state of a road in the vicinity of the road with the descending slope,
   a state of another vehicle in the vicinity of the vehicle, and
   a state in which a braking force of a brake that is installed in the vehicle has dropped below a specific force, the relationship between the vehicle and the road, and the acquiring step is adapted to acquire a degree of psychological stress for each acquire item of factor information and to acquire, as the overall psychological effect, a total of the degrees of psychological stress for all of the acquired items of factor information.

3. A non-transitory computer-readable medium encoded with a driving support program that causes a computer to perform the steps of claim 2.

4. The driving support device according to claim 1, further comprising:
   a control state determination processing unit that, in accordance with the overall psychological effect, determines a driver's intention based on a throttle position.

5. The driving support device according to claim 1 wherein the vehicle speed control unit is adapted to control the vehicle speed by using brakes of the vehicle, by switching a shift level and by regulating an opening of a throttle valve.

6. The driving support device according to claim 1 wherein the state of the road with the descending slope is a selected factor and wherein the item of information for the state of the road with the descending slope includes the inclination of the road with the descending slope.

7. The driving support device according to claim 1 wherein the item of information for the state of the road with the descending slope further includes the distance from the vehicle to an end point of the descending slope.

8. The driving support device according to claim 1 wherein the degree of psychological stress is determined for each acquired item of information by successive comparisons of the acquired item of information with predetermined threshold values for different levels of psychological stress.

9. The driving support method according to claim 2 wherein the state of the road with the descending slope is a selected factor and wherein the item of information for the state of the road with the descending slope includes the inclination of the road with the descending slope.

10. The driving support method according to claim 9 wherein the item of information for the state of the road with the descending slope further includes the distance from the vehicle to an end point of the descending slope.

11. The driving support device according to claim 9 wherein the degree of psychological stress is determined for each acquired item of information by successive comparisons of the acquired item of information with predetermined threshold values for different levels of psychological stress.

* * * * *